United States Patent
Mattison, Jr.

(10) Patent No.: US 6,203,108 B1
(45) Date of Patent: Mar. 20, 2001

(54) TAILGATE SEAT

(76) Inventor: James E. Mattison, Jr., 425 Waterway La., Fort Walton Beach, FL (US) 32547

( * ) Notice: Subject to any disclaimer, the term of this patent is extended or adjusted under 35 U.S.C. 154(b) by 0 days.

(21) Appl. No.: 09/356,117

(22) Filed: Jul. 15, 1999

(51) Int. Cl.[7] .................................................. A47D 1/10
(52) U.S. Cl. ............................ 297/352; 297/31; 297/41; 297/252; 297/423.34; 297/423.36
(58) Field of Search ........................... 297/352, 252, 297/31, 35, 423.1, 423.19, 423.24, 423.26, 423.3, 423.39, 423.4, 41

(56) References Cited

U.S. PATENT DOCUMENTS

| | | | | |
|---|---|---|---|---|
| 116,934 | * | 7/1871 | Cutter | 297/352 X |
| D. 121,266 | * | 7/1940 | Archer | 297/352 X |
| D. 368,809 | | 4/1996 | Fields | D6/368 |
| D. 388,968 | | 1/1998 | de Visser | D6/368 |
| 815,190 | * | 3/1906 | Marchessault | 297/352 |
| 823,199 | * | 6/1906 | Amann | 297/352 X |
| 859,560 | * | 7/1907 | Hyde | 297/352 |
| 1,126,911 | * | 2/1915 | Stull | 297/252 |
| 1,156,156 | * | 10/1915 | Lee | 297/423.34 |
| 1,185,807 | * | 6/1916 | Lee | 297/423.34 |
| 1,196,731 | * | 8/1916 | Clark | 297/352 X |
| 1,293,778 | * | 2/1919 | Holm | 297/352 X |
| 1,553,226 | * | 9/1925 | Felts | 297/252 |
| 1,721,366 | * | 7/1929 | Backstrom | 297/352 X |
| 1,756,687 | * | 4/1930 | Holliday | 297/352 |
| 1,809,392 | * | 6/1931 | Ponten et al. | 297/252 |
| 1,953,855 | * | 4/1934 | Headworth | 297/352 X |
| 2,108,531 | * | 2/1938 | Flanders | 297/352 X |
| 2,189,520 | * | 2/1940 | Inzerillo | 297/352 X |
| 2,247,269 | * | 6/1941 | Ashbacker | 297/352 X |
| 2,518,057 | * | 8/1950 | Orth | 297/352 |
| 2,528,433 | * | 10/1950 | Hines | 297/252 X |
| 2,647,563 | * | 4/1953 | Bishop et al. | 297/352 X |
| 2,697,476 | * | 12/1954 | Tripodi et al. | 297/41 |
| 2,702,076 | * | 2/1955 | Beardsley et al. | 297/252 |
| 2,708,960 | * | 5/1955 | Shephard | 297/41 X |
| 2,725,925 | * | 12/1955 | Sanderson et al. | 297/252 |
| 2,736,365 | * | 2/1956 | Hines | 297/352 X |
| 2,740,465 | * | 4/1956 | Mugler | 297/31 |
| 3,594,039 | * | 7/1971 | Harp | 297/252 |
| 3,861,745 | * | 1/1975 | Forrest | 297/423.26 |
| 3,994,529 | * | 11/1976 | Lippert | 297/252 |
| 4,611,852 | | 9/1986 | Filer | 297/352 |
| 5,000,504 | | 3/1991 | Munguia | 297/252 X |
| 5,516,193 | * | 5/1996 | Simpson | 297/352 X |
| 5,823,617 | * | 10/1998 | Schafer | 297/31 X |
| 5,971,474 | * | 10/1999 | Chang | 297/41 X |

FOREIGN PATENT DOCUMENTS

| | | | | |
|---|---|---|---|---|
| 2437330 | * | 2/1976 | (DE) | 297/352 |

* cited by examiner

*Primary Examiner*—Peter M. Cuomo
*Assistant Examiner*—Rodney B. White
(74) *Attorney, Agent, or Firm*—Peter Loffler

(57) ABSTRACT

A tailgate seat for attachment to the rear tailgate of a pickup truck is comprised of a first frame member having a first leg and a second leg joined by a first cross member and a second frame member having a third leg and a fourth leg joined by a second cross member. A first seating member is attached to the first frame while a second seating member is attached to the second frame. A first strut is pivotally attached to the first leg and to the third leg, and a second strut is pivotally attached to the second leg and to the fourth leg, the first and second struts being made from a resilient material. A third strut is pivotally attached to the first leg and to the third leg while a fourth strut is pivotally attached to the second leg and to the fourth leg. A first clip is attached to the first leg while a second clip is attached to the second leg, the first clip and the second clip each having a non-scuff member attached thereto. A third frame member having a fifth leg and a sixth leg may be attached to the first frame member.

5 Claims, 5 Drawing Sheets

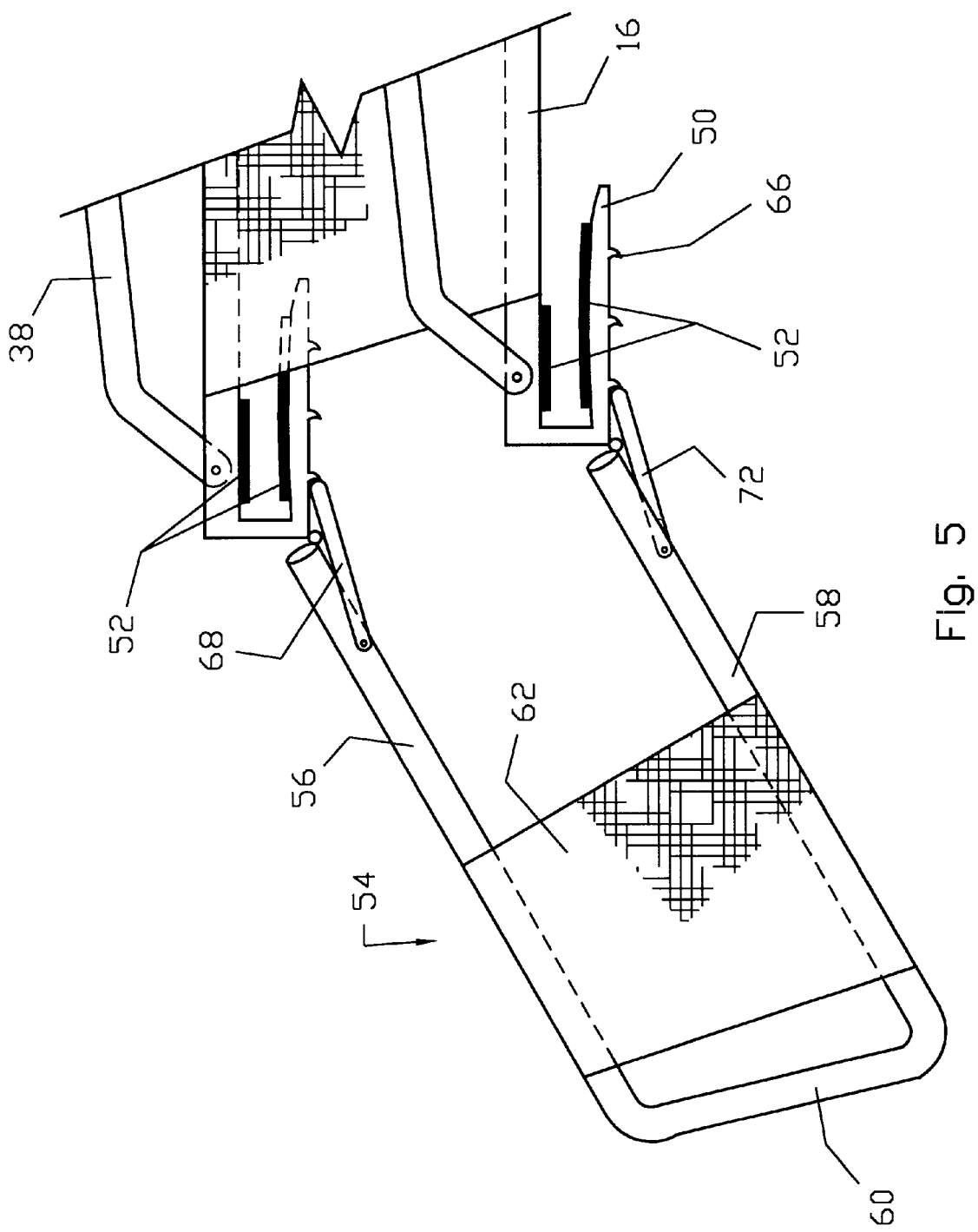

TAILGATE SEAT

BACKGROUND OF THE INVENTION

1. Field of the Invention

The present invention relates to a seat attachable to the tailgate of a pickup truck.

2. Background of the Prior Art

Portable seats are well known in the art. Such seats are usable in a wide variety of locations including stadium seating, beach seating, park seating, and the like. However, there is a need for a seat that is usable with a standard pickup truck's tailgate. Such a seat must be of relatively simple design and construction and must be easy to use. Ideally such a seat will be easy to store and transport. The seat should be foldable such that once folded, it will easily fit behind the seat of a typical pickup truck.

SUMMARY OF THE INVENTION

The tailgate seat of the present invention addresses the aforementioned needs in the art. The tailgate seat provides a seat that quickly and easily attaches to and detaches from a pickup truck's tail gate. The tailgate seat is of simple design and construction and is easy to use.

The tailgate seat of the present invention is comprised of a first frame member having a first leg and a second leg joined by a first cross member and a second frame member having a third leg and a fourth leg joined by a second cross member. A first seating member, made from a suitable material such as canvas or nylon and optionally having padding, is attached to the first frame member while a second seating member, made from a suitable material such as canvas or nylon and optionally having padding, is attached to the second frame member. A first strut, which may be made from a resilient material such as rubber, neoprene, and the like, is pivotally attached to the first leg and to the third leg, while a second strut, which may be made from a resilient material such as rubber, neoprene, and the like, is pivotally attached to the second leg and to the fourth leg. The resilient nature of these struts provides a cushioning effect whenever a user sits within the tailgate seat. A third strut is pivotally attached to the first leg and to the third leg while a fourth strut is pivotally attached to the second leg and to the fourth leg. A first clip is attached to the first leg while a second clip is attached to the second leg, the first clip and the second clip each having a non-scuff member attached thereto. A third frame member having a fifth leg and a sixth leg may be attached to the first frame member. A first plurality of protrusions are located on the first lower surface of the first clip while a second plurality of protrusions are located on the second lower surface of the second clip. A fifth strut, having a first lip, is pivotally attached to the fifth leg, the first lip engagable with of the plurality of first protrusions. A sixth strut, having a second lip, is pivotally attached to the sixth leg, the second lip engagable with of the plurality of second protrusions.

BRIEF DESCRIPTION OF THE DRAWINGS

FIG. 5 is a side elevation view of the tailgate seat having the third frame member attached.

Similar reference numerals refer to similar parts throughout the several views of the drawings.

DESCRIPTION OF THE PREFERRED EMBODIMENT

Figure 1:
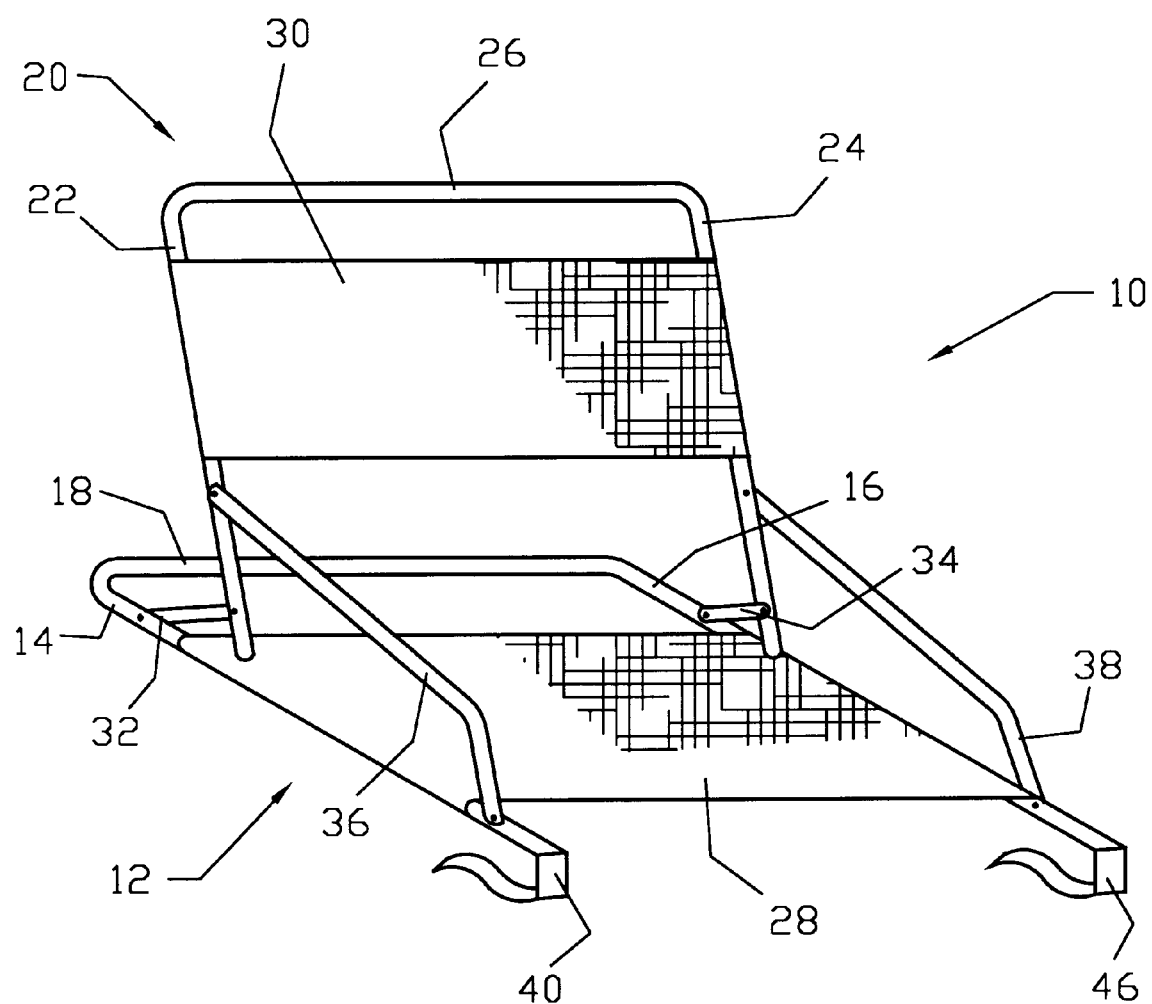
FIG. 1 is a perspective view of the tailgate seat of the present invention.
Figure 2:
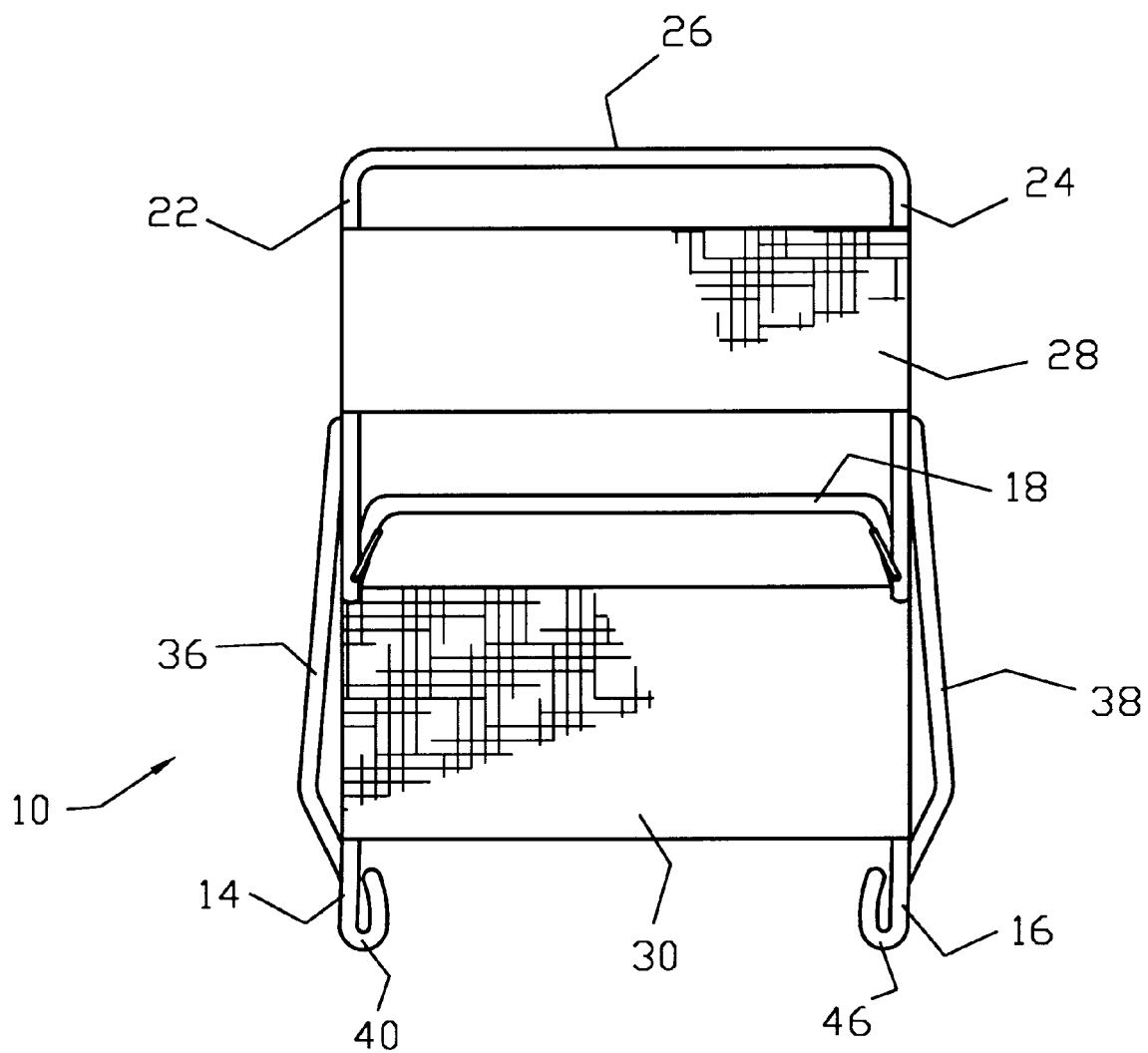
FIG. 2 is a front elevation view of the tailgate seat of the present invention.

Referring now to the drawings, it is seen that the tailgate seat of the present invention, generally denoted by reference numeral 10, is comprised of a first frame member 12 having a first leg 14 and a second leg 16 joined by a first cross member 18. A second frame member 20 has a third leg 22 and a fourth leg 24 joined by a second cross member 26. A first seating member 28 is attached to the first frame member 12 and stretches between the first leg 14 and the second leg 16. The first seating member 28 may be made from any appropriate material such as canvas, nylon, and the like and may be padded. A second seating member 30 is attached to the second frame member 20 and stretches between the third leg 22 and the fourth leg 24. The second seating member 30 may be made from any appropriate material such as canvas, nylon, and the like and may be padded.

A first strut 32 is pivotally attached to the first leg 14 and to the third leg 22 while a second strut 34 is pivotally attached to the second leg 16 and to the fourth leg 24, the first strut 32 and the second strut 34 each being made from a resilient material such as rubber, neoprene, and the like. A third strut 36 is pivotally attached to the first leg 14 and to the third leg 22, while a fourth strut 36 is pivotally attached to the second leg 16 and to the fourth leg 24. A first clip 40, having a first upper surface 42 and a first lower surface 44, is attached to the first leg 14 while a second clip 46, having a second upper surface 48 and a second lower surface 50, is attached to the second leg 16. As seen, a portion of the first clip 40 and a portion of the second clip 46 are each curved. A non-scuff material 52 is attached to the first leg 14 and the second leg 16 as well as to the first upper surface 42 and the second upper surface 48.

A third frame member 54 is provided having a fifth leg 56 attached to the first clip 40 and a sixth leg 58 attached to the second clip 46, the fifth leg 56 the sixth leg 58 being joined by a third cross member 60. A third seating member 62 is attached to the third frame 54. The third seating member 62 may be made from any appropriate material such as canvas, nylon, and the like and may be padded. A first plurality of protrusions 64 is located on the first lower surface 44, while a second plurality of protrusions 66 is located on the second lower surface 50. A fifth strut 68, having a first lip 70, is pivotally attached to the fifth leg 56, the first lip 70 engagable with one of the plurality of first protrusions 64 and a sixth strut 72, having a second lip 74, is pivotally attached to the sixth leg 58, the second lip 74 engagable with one of the plurality of second protrusions 66.

In order to use the tailgate seat 10 of the present invention, the device 10 is positioned such that the clips 40 and 46 engage the lower portion of a tailgate T, the non-scuff material 52 preventing scratches to the tailgate T. The device 10 is slid until the side of the clips 40 and 46 engage the top of the tailgate T. The first leg 14 and the second leg 16 rest on the tailgate T, with the non-scuff material 52 preventing damage to the tailgate T. A user sits in the device 10 such that his back rests against the second seating member 30, the third strut 36 and the fourth strut 38 preventing the second frame 20 from falling backwards.

If used, the third frame 54 is appropriately positioned such that the third frame 54 is pivoted to the desired positioned and the fifth strut's lip 70 is engaged with one of the first plurality of protrusions 64 and the sixth strut's lip 74 is engaged within one of the second plurality of protrusions 66 to hold the third frame member 54 in desired position. The user can rest his legs on the third seating member 62.

Figure 3:
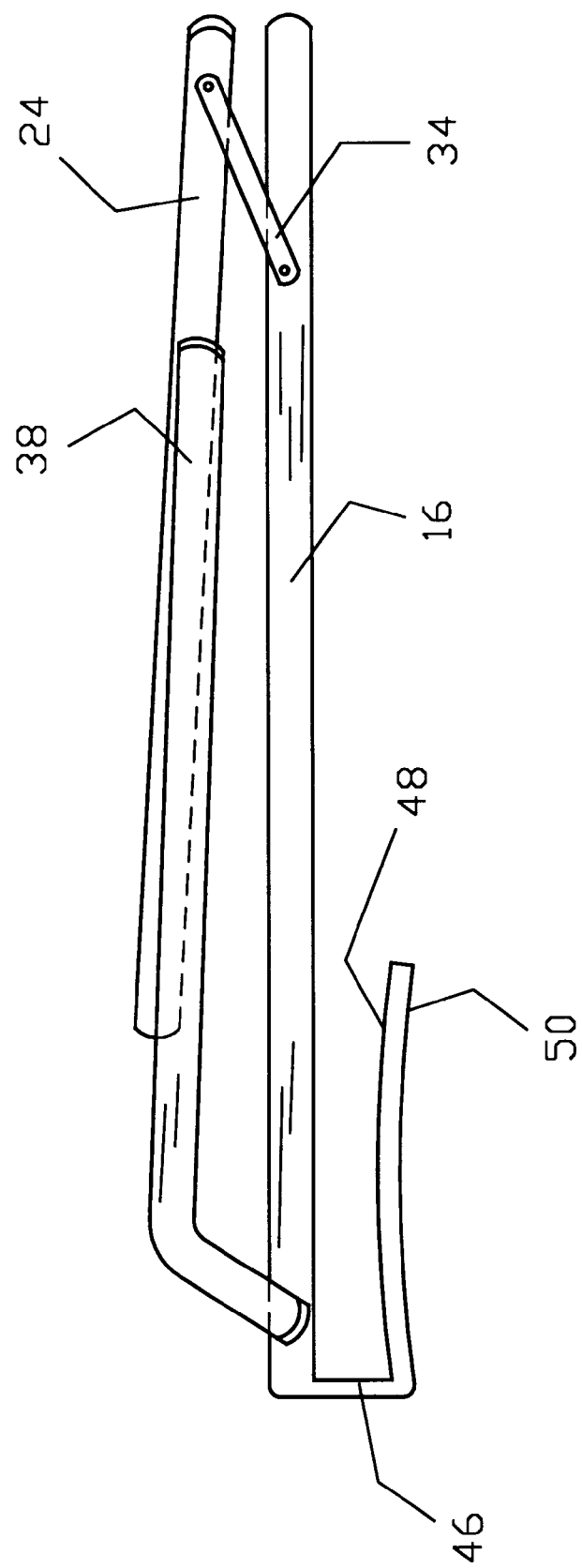
FIG. 3 is a side elevation view of the tailgate seat in a folded position.
Figure 4:
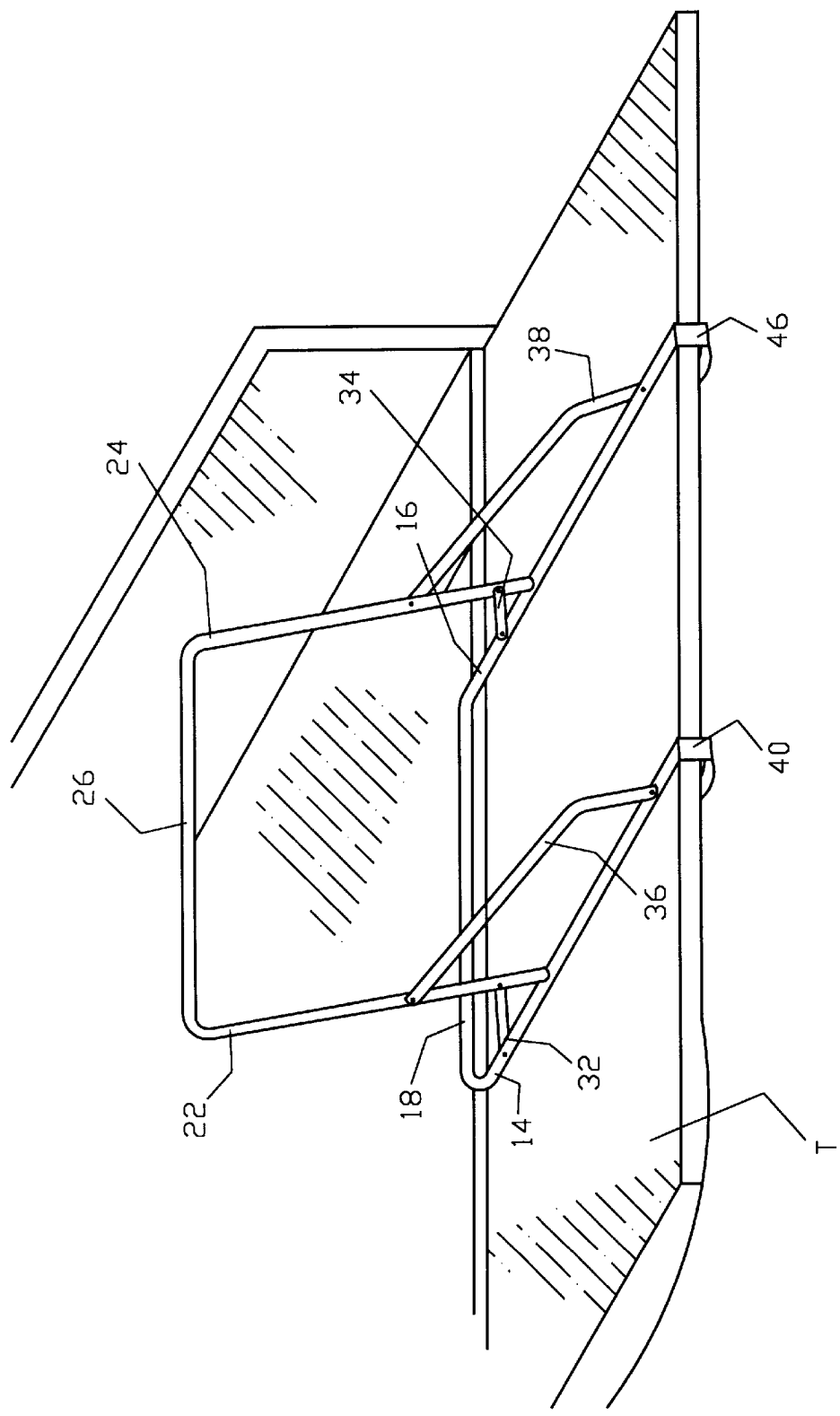
FIG. 4 is a perspective view of the tailgate seat attached to a pickup truck.

After use, the tailgate seat 10 can be folded, as seen in FIG. 3, for easy transport and storage, the resilient nature of the first strut 32 and the second strut 34 allowing for ease of foldability of the device 10.

While the invention has been particularly shown and described with reference to an embodiment thereof, it will be appreciated by those skilled in the art that various changes in form and detail may be made without departing from the spirit and scope of the invention.

I claim:

1. A tailgate seat comprising:

a first frame member having a first leg and a second leg joined by a first cross member;

a second frame member having a third leg and a fourth leg joined by a second cross member;

a first seating member attached to the first frame;

a second seating member attached to the second frame;

a first strut pivotally attached to the first leg and to the third leg;

a second strut pivotally attached to the second leg and to the fourth leg;

a third strut pivotally attached to the first leg and to the third leg;

a fourth strut pivotally attached to the second leg and to the fourth leg;

a first clip, having a first upper surface and a first lower surface, attached to the first leg;

a second clip, having a second upper surface and a second lower surface, attached to the second leg;

a third frame member having a fifth leg attached to the first clip and a sixth leg attached to the second clip, joined by a third cross member;

a third seating member attached to the third frame;

a first plurality of protrusions located on the first lower surface;

a second Plurality of protrusions located on the second lower surface;

a fifth strut, having a first lip, pivotally attached to the fifth leg, the first lip engagable within of the plurality of first protrusions; and a sixth strut, having a second lip, pivotally attached to the sixth leg, the second lip engagable within of the plurality of second protrusions.

2. The tailgate seat as in claim 1 wherein the first strut and the second strut are each made from a resilient material.

3. The tailgate seat as in claim 1 further comprising:

a first non-scuff layer attached to the first leg; and a second non-scuff layer attached to the second leg.

4. The tailgate seat as in claim 1 further comprising:

a first non-scuff layer attached to the first upper surface; and a second non-scuff layer attached to the second upper surface.

5. The tailgate seat as in claim 1 wherein the first clip and the second clip each have a curved portion.

\* \* \* \* \*